United States Patent

Marino

[15] 3,648,195

[45] Mar. 7, 1972

[54] MODULATOR USING A HARMONIC FILTER

[72] Inventor: Francis C. Marino, Huntington, N.Y.

[73] Assignee: Digitronics Corporation, Albertson, N.Y.

[22] Filed: Mar. 11, 1970

[21] Appl. No.: 18,515

[52] U.S. Cl. ....................332/14, 307/267, 328/145, 332/16 T, 332/18

[51] Int. Cl. ....................H04l 27/12

[58] Field of Search ....................332/9 R, 9 T, 14, 16 R, 16 T, 332/18; 325/30, 163; 178/66 R; 328/145; 307/267

[56] References Cited

UNITED STATES PATENTS

| | | | |
|---|---|---|---|
| 2,397,157 | 3/1946 | Roberts | 328/145 UX |
| 3,408,572 | 10/1968 | Wolf et al. | 325/163 |
| 3,451,012 | 6/1969 | Spiro | 325/163 X |
| 3,095,539 | 6/1963 | Bennett et al. | 325/163 |
| 3,205,442 | 9/1965 | Stamboulis | 178/66 X |

*Primary Examiner*—Alfred L. Brody
*Attorney*—Yuter & Fields

[57] ABSTRACT

A modulator for producing a low-harmonic content information signal alternating between a first and a second frequency from a baseband signal alternating between a first and a second potential which comprises signal-generating means which is adapted to produce a square wave having a first frequency when the baseband signal is at the first potential and a second frequency when the baseband signal is at the second potential. Wave-shaping means receives the square wave and converts the square wave into respective first and second frequency output signals at least a portion of which varies linearly with time. Also provided is a passive device having a characteristic which includes a substantially logarithmic voltage versus current relationship over a first region which is connected to the wave-shaping means and which receives the first and second output signals to produce the information signal.

13 Claims, 3 Drawing Figures

Patented March 7, 1972 3,648,195

2 Sheets-Sheet 2

INVENTOR.

FRANCIS C. MARINO

BY Yuter + Fields

Attorneys

MODULATOR USING A HARMONIC FILTER

The present invention relates generally to a frequency-shift-key modulator and, more particularly, to a frequency-shift-key modulator employing a novel harmonic filtering device which substantially eliminates harmonics in the transmitted information signal.

As the need for data transmissions from remote sites such as motels, hotels, small businesses, private homes and the like increases, the need for economical high-speed acoustic-coupled equipment for telephone line transmission of data similarly increases. Presently, frequency-shift-keying methods are utilized to transmit binary information via telephone lines by converting the binary signals into signals alternating between two audio frequencies and applying these alternating frequency signals to a conventional telephone handset. However, a problem is encountered at higher transmission rates above 600 bits per second (b.p.s.) in that phase continuity must be maintained. To be more specific, the beginning of a waveform representing a space signal must continue in the same phase as the ending of a waveform representing a mark signal when the frequency shift is from a mark to a space signal.

In the past, square wave generators have been used to form the fundamental mark and space frequencies to obtain such phase continuity in frequency-shift-key modulators. Thus, it is a relatively simple matter to effect a rapid change in the frequency of a square wave while maintaining phase continuity. However, the use of square waves in and of itself produces problems in view of the fact that a square wave is composed of a fundamental and odd harmonics whereas it is desired to transmit a symmetrical sinusoid. That is, it is difficult to obtain sinusoids having good symmetry from the square wave. Filters which filter out the odd harmonics of the wave have been used in an attempt to ameliorate the situation. However, conventional filters produce poor transitional responses and, accordingly, have not solved the problem.

Accordingly, an object of the present invention is to provide an improved frequency-shift-key modulator.

A more specific object of the present invention is to provide a frequency-shift-key modulator which is operable to transmit information with a low harmonic signal at increased bit rates.

Another object of the present invention is to provide an efficient and economical frequency-shift-key modulator for the transmission of binary information at relatively rapid rates.

A further object of this invention resides in the novel details of the circuitry which provide a frequency-shift-key modulator which may be used either with an acoustic coupler or connected directly to a data access unit.

Accordingly, a frequency-shift-key modulator constructed in accordance with the present invention is adapted to produce a low harmonic content information signal alternating between a first and a second frequency from a baseband signal alternating between a first and a second potential and comprises signal-generating means responsive to the baseband signal for producing an input signal having said first frequency when the baseband signal is at said first potential and an input signal having said second frequency when said baseband signal is at said second potential. Wave-shaping means is provided which is adapted to receive the first and second input signals for converting the input signals into respective first and second output signals at least a portion of which varies linearly with time. Also provided is a passive device having a characteristic which includes a substantially logarithmic voltage-versus-current relationship over a first region which is connected to the wave-shaping means for receiving the first and second output signals therefrom to produce the information signal.

Other features and advantages of the present invention will become more apparent from a consideration of the following detailed description when taken in conjunction with the accompanying drawings, in which.

Figure 1:
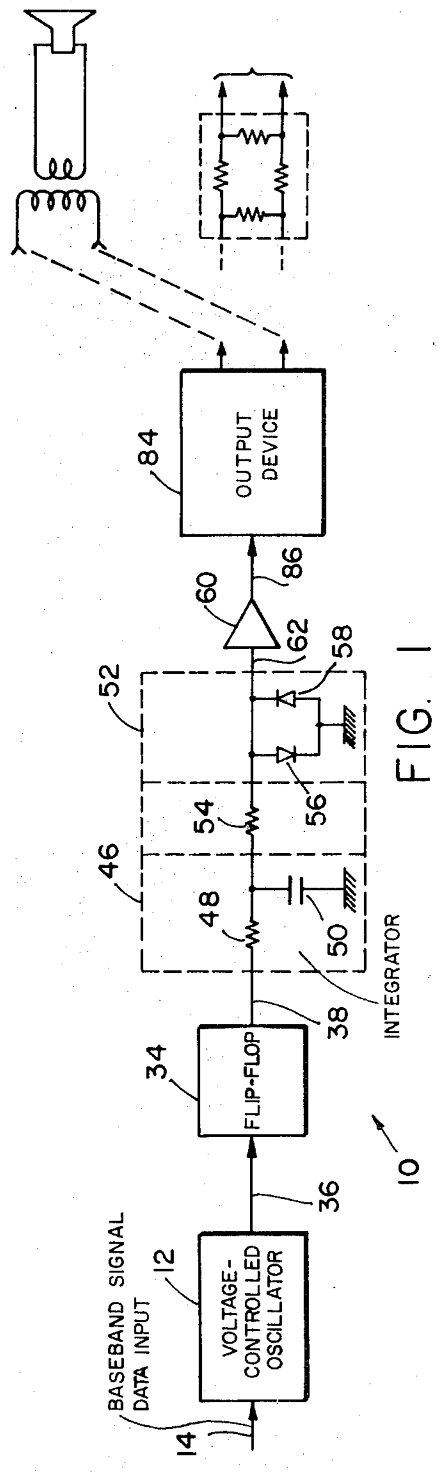
FIG. 1 is a schematic circuit diagram, partially in block form, of a modulator constructed according to the present invention.

The modulator of the present invention is shown schematically in FIG. 1 and is designated generally by the reference numeral 10 and comprises a voltage-controlled oscillator 12. The oscillator 12 receives the baseband signal data output via a lead 14. The input signal in the illustrative example alternates between two potentials which respectively represent a mark signal and a space signal. The oscillator 12 is operable to convert the base band signal into a signal which alternates between two different frequencies wherein one frequency represents the mark signal and the other frequency represents the space signal.

Figure 2:
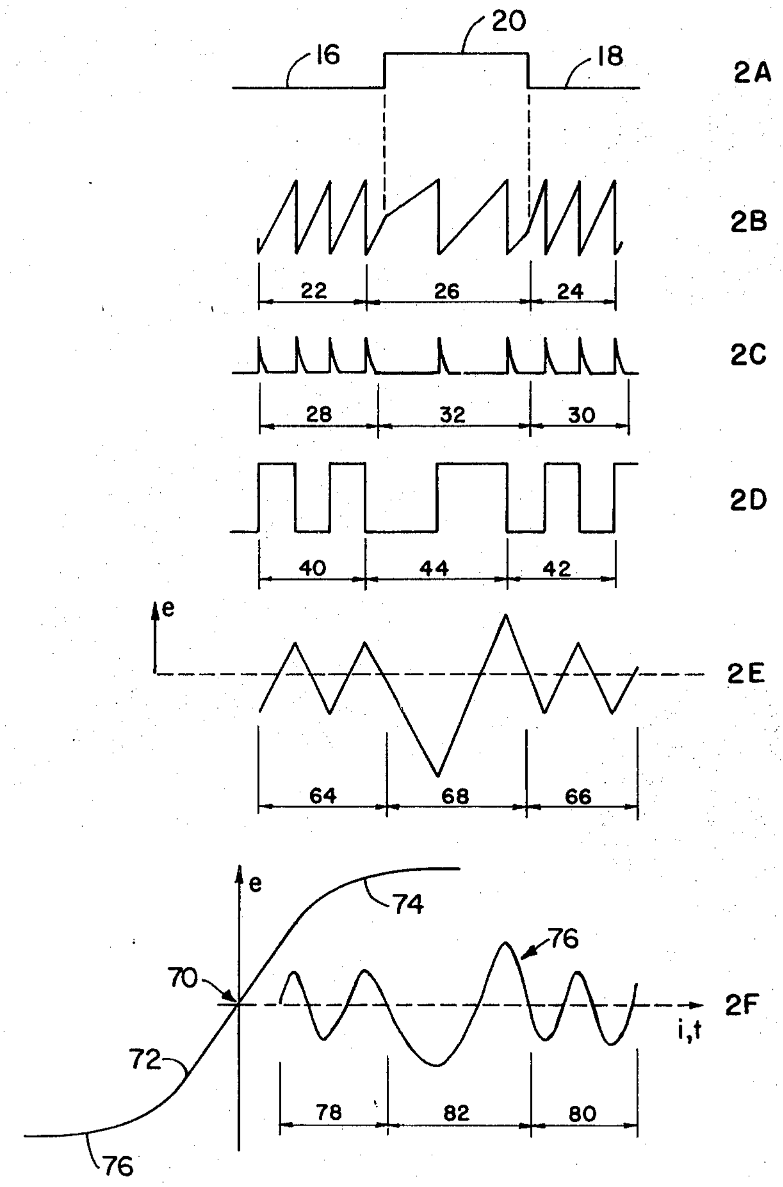
FIG. 2 illustrates the waveforms appearing at various points in the circuit of FIG. 1.

More specifically, the input baseband signal is shown in FIG. 2A and comprises 0-voltage portions 16 and 18 which represent the space signal. Intermediate the portions 16 and 18 is a portion 20 of substantially higher potential than the portions 16 and 18 and represents a mark signal. This signal is applied to lead 14 and thereby to the input of the voltage-controlled oscillator. The oscillator 12 produces the waveform shown in FIG. 2B which includes portions 22 and 24 of a first frequency corresponding to the space frequency portions 16 and 18 of the base band signal. Additionally, in response to the mark portion 20 of the base band signal the oscillator produces the waveform portion 26 of the signal shown in FIG. 2B. It is to be noted that the frequency of the signal portions 22 and 24 of the waveform of FIG. 2B is greater than the frequency of the portion 26 of the waveform.

The oscillator 12 may include appropriate wave-shaping and clamping circuits so that the signal appearing at the output terminals of the voltage-controlled oscillator 12 is as shown in FIG. 2C wherein the portions 28 and 30 of the waveform correspond to a space signal and the portion 32 of the waveform of FIG. 2C corresponds to the mark signal of the original baseband waveform.

The output signal of FIG. 2C is applied to a bistable multivibrator or flip-flop 34 via a lead 36. The multivibrator or flip-flop 34 is conventional in construction and has two steady states of operation. The flip-flop 34 is adapted to change its state of operation in response to a pulse appearing on the input lead 36.

The flip-flop 34 produces the square wave of FIG. 2D on the output lead 38 connected thereto. That is, each time a pulse of the waveform of FIG. 2C is applied to the flip-flop 34, the flip-flop 34 changes states to provide the square wave waveform. As shown in FIG. 2D, the waveform includes portions 40 and 42 of greater frequency than the intermediate portion 44 which represent the corresponding space signals. The intermediate portion 44 of lower frequency represents the mark signal. At this point, it is emphasized that the respective mark and space signals are represented by square waves of varying frequencies.

The waveform of FIG. 2D from the output of the flip-flop 34 is applied to the integrator or integrating network 46 via the lead 38. The integrator 46 includes a series-connected resistor 48 and a shunt capacitor 50. The integrator is connected to a signal device 52 through a resistor 54. The signal device 52 comprises a pair of diodes 56 and 58 which are connected in inverse parallel relationship with respect to each other between the input and output terminals of the device and ground. The output of the signal device 52 is connected to the input of an emitter follower 60 by a lead 62.

As noted above, the input waveform applied to the integrator 46 via the lead 38 is a square wave of varying frequency in accordance with either a mark or a space signal. Since the integrator 46 is conventional in construction, it integrates the square wave and produces a triangular waveform as shown in FIG. 2E. That is, the integration of the square wave of FIG. 2D results in the triangular waveform of FIG. 2E which then appears at the input to the signal device 52. The waveform 2E includes portions 64 and 66 of greater frequency than the intermediate portion 68 in accordance with the corresponding portions of the waveform of FIG. 2D which are similarly of varying frequency. Hence, the portions 64 and 66 represent the space signal whereas the portion 68 represents the mark signal in the original baseband input signal. It is to be noted that the waveform of FIG. 2E is a voltage which varies linearly with respect to time. That is, the magnitude of the voltage increases linearly with respect to time, reaches a peak, and then decreases linearly with respect to time until it reaches a negative peak. At this point, the signal again begins to increase with respect to time, etc. It is also to be noted that the circuit parameters are chosen so that the maximum amplitude and minimum amplitudes of the signal of FIG. 2E do not cause the diodes in the nonlinear device 52 to begin a clamping action, as noted in detail below.

The characteristic curve for the signal device 52 is shown in FIG. 2F and is designated by the reference numeral 70. The characteristic curve 70 includes a first region 72 wherein the voltage varies substantially logarithmically with respect to the current. The characteristic curve 70 also includes a portion 74 which follows the portion 72 wherein the valve of the voltage is asymptotic or substantially constant with respect to the current. Similarly, the curve includes a portion 76 which precedes the portion 72 wherein the voltage is asymptotic or substantially constant with respect to the current.

It will now be obvious that the triangular input waveform to the signal device 52 varies linearly with respect to time, the output waveform from the signal device will similarly vary with respect to time. However, since the portion 72 of the characteristic 70 of the device 52 is substantially a logarithmic variation of voltage with respect to current, the output waveform from the signal device will approximate a sinusoid or a sinusoidal signal having a frequency which is directly related to the frequency of the input triangular waveform. That is, the output signal from the device 52 which is applied to the emitter follower 60 will be as shown by the waveform 76 of FIG. 2F. Thus, the waveform 76 includes portions 78 and 80 which are of the same frequency and are of a greater frequency than the intermediate portion 82 of the signal or waveform 76. It will further be obvious that the portions 78 and 80 of the waveform 76 represent space signals whereas the portion 82 represents a mark signal. The waveform 76 is applied, through the emitter-follower 60, to an output device 84 which may be an amplifier, an acoustic coupler or the like. Accordingly, the output signal applied to the output device 84 will comprise a signal which alternates between two frequencies wherein each one of the frequencies represents either a mark or a space signal.

An examination of the waveform 76 shows that there is substantially perfect phase continuity during a transition from a mark to a space signal or from a space signal to a mark signal. In addition thereto, the output waveform 76 is substantially a sinusoid and therefore contains substantially no harmonics whatsoever. In fact, the circuit parameters are chosen so that the amplitude of the waveform of FIG. 2E, in both the positive and the negative directions, does not exceed the values of the voltage which define the boundaries of the region 72 of the curve 70. That is, in order to maintain a low-harmonic output signal, the input signal to the signal device is such that the signal device 52 operates in the logarithmic region of the characteristic 70. Additionally, it is to be noted that the output waveform 76 is, for all intents and purposes, symmetrical about the axis.

Figure 3:
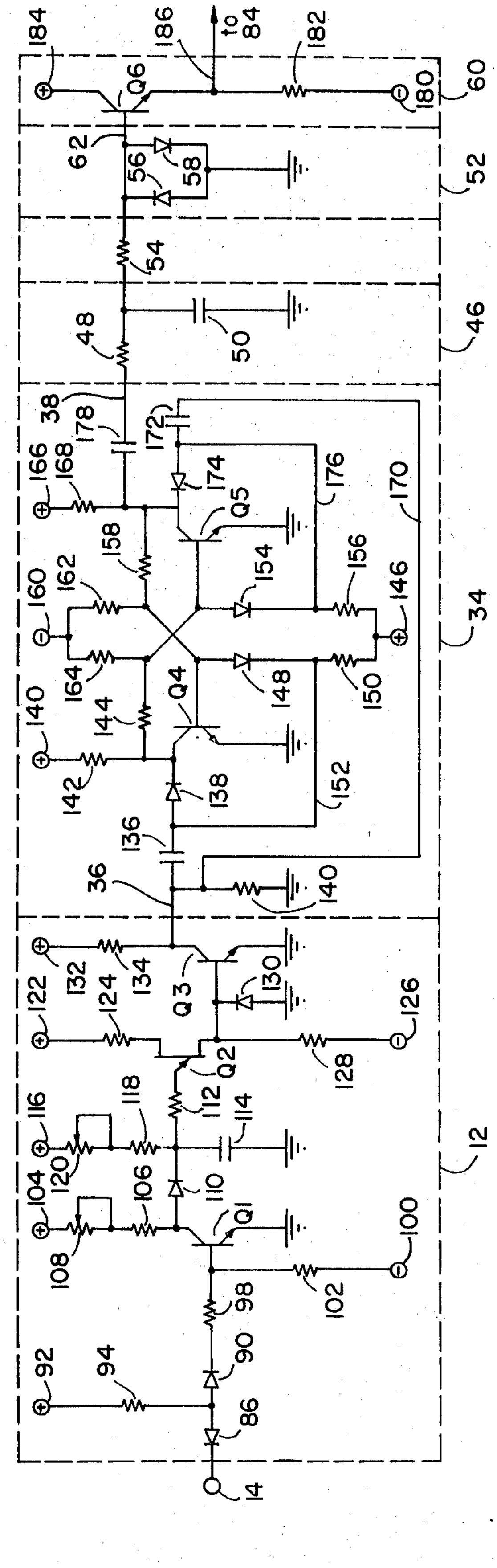
FIG. 3 is a schematic circuit wiring diagram of the modulator of FIG. 1.

FIG. 3 illustrates a schematic wiring diagram of the frequency-shift-key modulator of FIG. 1. Accordingly, the voltage-controlled oscillator 12 may comprise a unijunction relaxation oscillator utilizing a unijunction transistor. More particularly, the lead 14 which receives the baseband input signal alternating between the two voltage levels is connected to the cathode electrode of a diode 86. The anode electrode of the diode 86 is connected to the anode electrode of a diode 90 and to the positive terminal of a source 92 through a resistor 94. The cathode electrode of the diode 90 is connected to the base electrode of the transistor Q1 through a series-connected resistor 98. The base electrode of Q1 is also connected to a negative source 100 through a resistor 102. The emitter electrode of the transistor Q1 is connected to ground and the collector electrode thereof is connected to a positive source 104 through the series connection of a resistor 106 and a variable resistor 108. The collector electrode of Q1 is also connected to the anode electrode of a diode 110 the cathode electrode of which is connected to the emitter electrode of a unijunction transistor Q2 through a series resistor 112. The cathode electrode of the diode 110 is also connected to ground through a capacitor 114 and to the positive terminal of a source 116 through the series circuit of a resistor 118 and a variable resistor 120. Base 2 of the transistor Q2 is connected to a positive source 122 through a resistor 124. Base 1 of the unijunction transistor Q2 is connected to the negative terminal of a source 126 through a resistor 128. Base 1 of Q2 is also connected to the base electrode of a transistor Q3 and to the cathode electrode of a diode 130, the anode electrode of which is connected to ground.

The emitter electrode of the transistor Q3 is connected to ground and the collector thereof is connected to the positive terminal of a potential source 132 through a resistor 134. The collector electrode of the transistor Q3 is also connected to the flip-flop or bistable multivibrator 34 via the lead 36.

The frequency of the oscillator 12 is controlled by the baseband signal or, more specifically, by the voltage of the signal appearing on the lead 14. Assuming that a mark or positive signal is applied to the lead 14, the transistor Q1 conducts and the diode 110 becomes back biased. Accordingly, the frequency of the oscillator which includes the unijunction transistor Q2 and its associated elements is determined by capacitor 114 and the resistors 120 and 118. The resistor 120 may be varied so that the mark frequency is exactly 1,300 Hz. Thus, when a mark signal is applied to the lead 14 the oscillator produces a 1,300 Hz. signal which represents a mark signal.

On the other hand, when a space or 0 potential signal is applied to the lead 14, the diode D1 begins conducting and the transistor Q1 is cut off by the negative potential from the source 100 applied to the base electrode thereof. Accordingly, diode 110 becomes forward biased due to the positive source 104 and resistors 108 and 106 are essentially connected in parallel with resistors 120 and 118. Thus, the time constant of the oscillator is now determined by the capacitor 114 and the parallel combination of series resistors 118 and 120 in parallel with resistors 106 and 104. Thus, the oscillator begins to oscillate at a frequency, in the illustrative example, of 2,100 Hz. which represents the space signal. As a result, the baseband signal which alternates between the two potential levels is converted into a signal which alternates between two frequencies. The signal appearing on the base 1 electrode of the unijunction transistor Q2 is illustrated in FIG. 2A.

The diode 130 clips the negative half of the waveform appearing on the base 1 electrode of the unijunction transistor Q2 and, after passing through the amplifier comprising the transistor Q3, the waveform will appear as shown in FIG. 2C. This waveform is applied to the flip-flop 34.

Connected to the lead 36, through a coupling capacitor 136, is the anode electrode of a diode 138. Also connected between the lead 36 and ground is a resistor 140. The cathode electrode of the diode 138 is connected to the collector electrode of a transistor Q4, the emitter electrode of which is connected to ground. The collector electrode of the transistor Q4 is also connected to a positive source 140 through a resistor 142. Also connected to the collector electrode of the transistor Q4 is the base electrode of a transistor Q5, through a resistor 144. The base electrode of the transistor Q4 is connected to a positive source 146 through a series circuit comprising a diode 148 and a resistor 150. The diode is poled so that the anode electrode thereof is connected to the base electrode of the transistor Q4. The junction of the diode 148 and the resistor 150 is connected to the junction of the diode 138 and the capacitor 136 by a lead 152. The base electrode of the transistor Q5 is also connected to the source 146 through a series circuit comprising a diode 154 and a resistor 156. The emitter electrode of the transistor Q5 is connected to the base electrode of the transistor Q4 through a resistor 158. Additionally, the base electrode of the transistor Q4 and the base electrode of the transistor Q5 are connected to a negative source 160 through respective resistors 162 and 164. The collector electrode of the transistor Q5 is also connected to a positive source 166 through a resistor 168. Also connected to the collector of the transistor Q5 is the lead 36 through a lead 170, a capacitor 172, and a diode 174. The diode 174 is poled so that the cathode electrode thereof is connected to the collector electrode of the transistor Q5. Additionally, the junction of the diode 174 and the capacitor 172 is connected to the junction of the resistor 156 and the diode 154 by a lead 176. The output waveform of the flip-flop 34 appears on the collector electrode of the transistor Q5 which is connected to the integrator 46 via a coupling capacitor 178.

The bistable multivibrator or flip-flop 34 is conventional in construction and its operation will not be described in detail. However, it is to be noted that each one of the pulses of the waveform of FIG. 2C appearing on the lead 36 will cause the flip-flop to change states whereby the square wave of FIG. 2D appears at the input to the integrator. Since the frequency at which the multivibrator changes states is dependent upon the frequency of the triggering pulses, it will be obvious that the frequency of the square wave output will be equal to the frequency of the input triggering pulses. Hence, the square-wave output signal from the flip-flop will vary at the mark frequency and the space frequency.

The integrator 46 includes the resistor 48 one end of which is connected to the coupling capacitor 178. The other end of the resistor 48 is connected to the resistor 54 and to ground through the capacitor 50. The integrator comprising the resistor 48 and the capacitor 50 integrates the square-wave output of the multivibrator to produce the triangular waveform of FIG. 2E. The resistors 48 and 54 are chosen so that the resistor 48 is much larger than the resistor 54 whereby the current is maintained substantially constant.

The resistor 54 is connected to the signal device 52 which includes the diodes 56 and 58 connected in inverse parallel relationship between the lead 62 and ground. That is, the cathode electrode of the diode 56 is connected to the lead 62 and the anode electrode thereof is connected to ground. On the other hand, the anode electrode of the diode 58 is connected to the lead 62 and the cathode electrode thereof is connected to ground.

As noted above, the signal device 52 produces the waveform 76 shown in FIG. 2F. In practice, the circuit parameters of the flip-flop 34 are chosen so that the maximum amplitude of the integrated signal will not exceed the potentials which define the boundaries of the logarithmic portion 72 of the characteristic 70. It is to be noted that if the amplitude does exceed this value, the diodes 56 and 58 will clamp the signal to this value. Hence, although some slight distortion may be introduced by this clamping action, there is a limitation on the amount of harmonic distortion.

In any case, it is to be noted that even if harmonics are contained in the final output waveform they are primarily odd due to the provisions of excellent symmetry and phase continuity that is inherent in the present invention. Moreover, it has been found that this odd harmonic distortion in the generated waveform is less deleterious with this type of transmission than it would be with even harmonic distortion. This is due to the fact that the symmetry of the received waveform is usually more important in demodulators of the type utilized with this type of transmission, such as the Bell Telephone Systems 202C Demodulator than is deviation from a pure sine wave.

The waveform 76 appearing on the lead 72 is applied to the emitter follower 60 which comprises a transistor Q6 the base electrode of which is connected to the lead 62. The emitter electrode of the transistor Q6 is connected to a negative source 180 through a resistor 182. The collector electrode of the transistor is connected to a positive source 184. The output of the emitter follower is connected to the output device 84 via a lead 186. As noted above, the output device may comprise a transformer coupled linear amplifier which, in turn, may be connected either to an acoustic coupler for transmission via the telephone lines or to a data access unit through an appropriate attenuator.

Accordingly, a frequency-shift-key modulator has been disclosed which employs a unique harmonic filtering arrangement which produces a signal alternating between two frequencies from a baseband signal which alternates between two voltage levels wherein the output signal, which is derived from a square wave, contains low harmonic distortion and excellent phase continuity in addition to being highly symmetrical about the axis.

While a preferred embodiment of the invention has been shown and described herein, it will become obvious that numerous omissions, changes and additions may be made in such embodiment without departing from the spirit and scope of the present invention.

What is claimed is:

1. A harmonic filter for substantially attenuating harmonic frequencies comprising means for providing a square wave data signal having a fundamental and harmonic frequencies, wave-shaping means adapted to receive said data signal for converting said data signal into an output signal having a portion thereof varying linearly with respect to time; and a passive signal device having a characteristic which includes a substantially logarithmic voltage-versus-current relationship over a first region and a substantially constant voltage-versus-current relationship over a second region connected to said wave-shaping means for receiving the output signal of said wave-shaping means and producing an approximately sinusoidal waveform of a low harmonic content signal.

2. A harmonic filter as in claim 1, in which said second region of said characteristic is contiguous with said first region and follows said first region.

3. A harmonic filter as in claim 2, wherein said characteristic includes a third region having a substantially constant voltage-versus-current relationship which precedes said first region.

4. A harmonic filter as in claim 1, in which said wave-shaping means comprises an integrating network which integrates said square wave to produce a triangular waveform corresponding to said wave-shaping means output signal.

5. A harmonic filter as in claim 4, in which said signal device comprises a pair of unidirectional current-conducting elements connected in inverse parallel relationship.

6. A harmonic filter as in claim 5, in which said unidirectional elements comprise diodes.

7. A harmonic filter as in claim 4, and a square-wave generator for producing said input square wave having an amplitude which does not exceed the limiting value of said first region.

8. A modulator for producing a low-harmonic content information signal alternating between a first and a second frequency from a base band signal alternating between a first and a second potential comprising signal generating means responsive to said base band signal for producing an input signal having said first frequency when said base band signal is at said first potential and an input signal having said second frequency when said base band signal is at said second potential; wave-shaping means including an integrating network which integrates said first and second input signals for converting said input signals into respective first and second triangular-shaped output signals, and a passive device having a characteristic which includes a substantially logarithmic voltage-versus-current relationship over a first region connected to said wave-shaping means for receiving the first and second output signals therefrom to produce said information signal.

9. A modulator as in claim 8, in which said signal-generating means includes means for limiting the amplitude of said first and second input signals to a value not exceeding the limiting value of said first region.

10. A modulator as in claim 8, in which said signal-generating means comprises a square-wave generator for generating square waves having said first and second frequencies.

11. A modulator as in claim 10, in which said wave-shaping means comprises an integrating network which integrates said square wave to produce a triangular waveform corresponding to said first and second output signals.

12. A modulator as in claim 10 in which said passive device comprises a pair of diodes connected in inverse parallel relationship.

13. A modulator as in claim 10, in which said signal generator means further comprises a voltage-controlled oscillator preceding said square wave generator and operable to produce a first frequency signal in response to said first potential baseband signal and a second frequency signal in response to said second potential baseband signal.

* * * * *